Oct. 20, 1964 P. R. O'BRIEN 3,153,557
WHEEL WITH DOVETAILED RIB FORMATIONS
Filed Dec. 13, 1962

INVENTOR.
PAUL R. O'BRIEN
BY
HIS ATTORNEYS

United States Patent Office 3,153,557
Patented Oct. 20, 1964

3,153,557
WHEEL WITH DOVETAILED RIB FORMATIONS
Paul R. O'Brien, Anchorage, Ky., assignor to Reynolds Metals Company, Richmond, Va., a corporation of Delaware
Filed Dec. 13, 1962, Ser. No. 244,515
15 Claims. (Cl. 301—6)

This invention is directed to a wheel construction in which dovetailed rib formations are provided. It is applicable, for example, to wheel constructions in which there is a bearing receiving drum, which may have a braking surface if desired, and a tire mounting wheel which is secured to the drum. In such a construction, the drum may have a rim portion with an outward cylindraceous rim surface and the tire mounting wheel may have an inward cylindraceous surface overlapping the outside of the rim surface. These surfaces may be provided with generally radical ribs which may be circumferentially spaced on such surfaces and said ribs may extend in a direction generally transverse to the direction of rotation of such surfaces.

One of the advantages of this invention is that the drum construction may be made of a considerably larger diameter to provide a larger diameter brake surface. The tire mounting wheel construction may be made relatively small because of the dovetailed construction. The bearing drum and the tire wheel may be considerably closer to each other than the combined radial width of the two sets of ribs because of the dovetailing action.

Another advantage of this invention is that the dovetailed ribs may produce a forced draft action which may circulate cooling air between such ribs, in a manner to dissipate the heat of the braking action and to prevent such heat from heating and damaging the tire mounted on the tire wheel.

Figure 1:
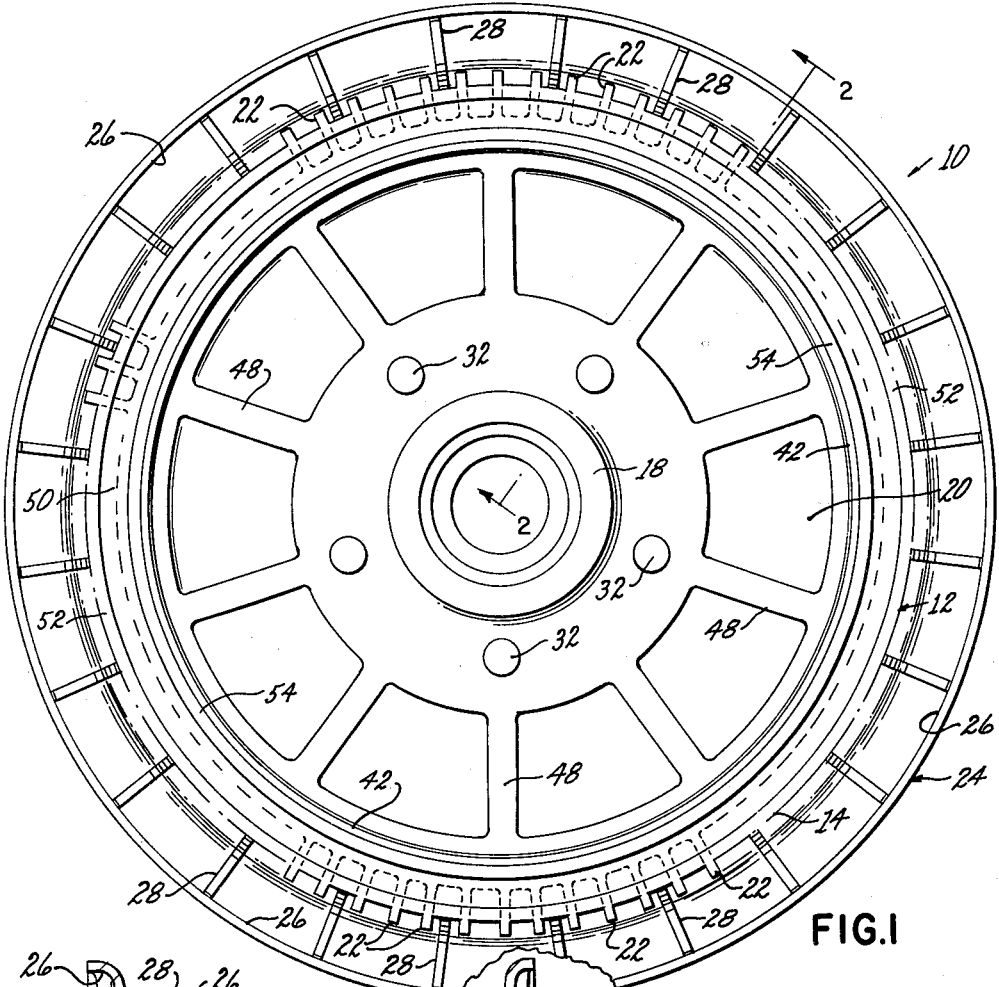
Figure 2:
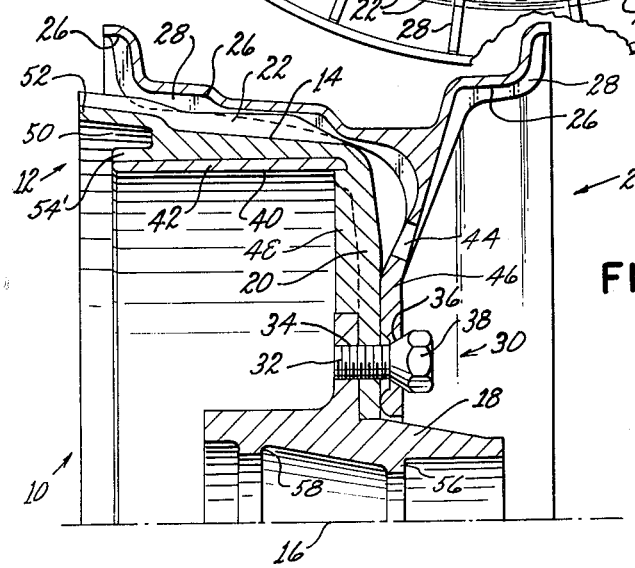

Other features and advantages are apparent from this description, the appended claimed subject matter, and/or the accompanying drawings in which:

FIGURE 1 is a side elevation of the wheel construction.
FIGURE 2 is a cross section along the line 2—2 of FIGURE 1.

This invention includes an improvement over the wheel construction disclosed in my co-pending United States patent application, SN 47,831, filed August 5, 1960, to which reference is made for a more detailed description, if necessary.

This invention is applicable to wheels made according to the disclosure in said co-pending application, and is also applicable to other types of wheels.

A bearing receiving drum and the like 10 may have a cantilever cylindraceous rim portion 12 with an outward cylindraceous surface 14 which may be generally coaxial with the axis of rotation 16 of said drum.

The drum 10 may have a bearing receiving central portion 18. The drum also may have an intermediate supporting portion or disc shaped construction 20.

Outward ribs 22 may be circumferentially spaced on said outward cylindraceous surface 14. Such ribs may be generally parallel to the axis of rotation 16, or they may be generally transverse to the direction of rotation of the wheel construction. Such ribs may be placed thereon for strengthening purposes, for air circulating purposes, and for other advantageous purposes, as desired.

A tire mounting wheel 24 may be provided, and may have a cantilever cylindraceous tire well with an inward cylindraceous surface 26 overlapping the outside of the rim surface 14 of cantilever cylindraceous rim portion 12. Such inward surface 26 may have inward ribs 28 circumferentially spaced on said inward cylindraceous surface 26 to dovetail between certain of said outward ribs 22.

Conversely, certain of the outward ribs 22 are dovetailed between certain of inward ribs 28 and with the inward ribs and the sides of said inward ribs being completely spaced from the outward ribs and the sides of said outward ribs to produce free air flow passages and a complete conduction thermal break between said inward and outward ribs and the sides of said ribs.

Attaching means 30 may be provided to attach the tire mounting wheel 24 to the bearing drum 10. Such attaching means 30 may automatically rotationally orient the inward and outward ribs in dovetailing relationship, as indicated in FIGURE 1, in a manner to prevent the ribs from blocking each other and thus preventing proper dovetailing relationship. The tire wheel 24 may have a web or inward disc shaped portion 46 extending inwardly from the cylindraceous surface of tire well 26 which may be attached to the brake drum 10 along the disc shaped portion 20 a substantial inward radial distance from the brake band 40. The disc 46 may diverge outwardly from the disc 20 radially outward from the point of attachment of the attaching means 30 to produce a relatively long circuitous heat conducting resistance path between the brake band 40 and the tire well 26.

The attaching means 30 may include a plurality of bolts 32 which may attach the tire wheel 24 to the drum 10, and may engage the drum 10 and the wheel 24 in any suitable manner. For example, the bolts 32 may be threadedly inserted in proper threaded openings 34. The wheel 24 may be provided with openings 36 through which the bolts 32 are inserted, and which openings 36 may receive the bolt heads 38 to hold and lock the wheel 24 on the drum 10. However, the bolt construction may be of any other type such as with the bolts press fitted into the drum, with their threaded ends extending toward the wheel 24. In such arrangement the wheel 24 may be provided with openings which are fitted over the ends of the bolts, with bolt nuts threaded on the ends of the bolts and holding the tire wheel on the drum.

The outward ribs 22 may be evenly spaced circumferentially around the outward cylindraceous surface 14. For example, there may be 72 of such ribs evenly spaced circumferentially around the surface 14.

The inward ribs 28 may be evenly spaced around the inward cylindraceous surface 26. For example, there may be 24 ribs 28 on the surface 26. Consequently the number of inward ribs 28 is so related to the number of outward ribs 22 that said ribs have a dovetailing relationship, as is shown in FIGURE 1. Free air flow is provided along the sides of the inward ribs 28 and along the sides of the outward ribs 22. Such free air flow is also provided along the dovetailing sides of said inward ribs 28 and along the dovetailing sides of said outward ribs 22, as shown in FIGURE 1.

The rim portion 12 may be provided with a brake band 42 having an inward cylindrical brake surface 40 which may be machine finished in coaxial relationship with the axis of rotation 16, if desired. If desired, the wheel 10 may be of the character disclosed in my co-pending application, in which both the wheel 10 and wheel 24 may be made of any suitable metallic material of a ductile nature, and strong enough for the intended use of the wheel. For example, the wheels may be made of a suitable aluminum alloy such as an aluminum having the characteristics of wrought aluminum alloys Nos. 6062–T62, 6061–T62, 2014–T4, 2024–T4, or other similar alloys in the 20, 50 or 60 series class or their equivalent.

If desired, this brake band 42 may be an iron containing brake band, which may be of a metallic substance which is dominantly iron, such as a cast iron brake band or a steel band. As disclosed in my said co-pending application, this brake band may be secured to the wheel 10 by thermal differential contraction and by metallurgical bonding between the band and the aluminum containing body, as more fully described in said co-pending application.

The tire mounting wheel 24 may have its surface 26 tubular and in overlapping relationship with the tubular rim portion 12. The tire wheel 24 may have a web or inward disc shaped portion 46 extending inward from the cylindraceous surface or tire well 26.

The attachment of the wheel 24 to the drum 12 may be of any type desired, and preferably is so made that air flow means is provided, such as openings of proper configuration which are provided to cause air to pass between the sides of the ribs 22 and 28. For example, openings 44 may be provided along the wheel construction 24 at any suitable place, as indicated in FIGURE 2. However, such openings may be produced by suitable fluted constructions and the like. Such fluted constructions may provide openings or passageways between the web portion 46 of the wheel 24 and the disc joining portion 20 of the drum 10.

If desired, inward strengthening and radial ribs 48 may be produced on the intermediate supporting portion or disc portion 20.

If desired, the drum may be provided with a circumferential groove construction 50 which has an outer and longer extension 52 and an inner and shorter extension 54. The rib constructions 22 may extend over the extension 52, as illustrated.

If desired, the rib constructions 28 also may extend along one or both sides of the central web 46 of the tire wheel 24. These rib constructions may be generally radial with respect to the axis 16.

The bearing receiving portion 18 may be provided with bearing receiving members 56 and 58, which may be of any type suitable for receiving any standard bearing construction, as desired. However, the bearing construction 18 may be made detachable from the intermediate supporting portion, if desired and the bolts 32 may attach together such bearing construction 18, the intermediate portion 20, and the disc 46 of wheel 24.

It is thus to be seen that a wheel construction has been provided in which a bearing receiving drum, which also may be a brake drum, may be provided with outer spaced ribs which cooperate with inwardly spaced ribs on the tire mounting wheel construction in such a manner that these rib formations dovetail with respect to each other and thus permit advantageous cooperation between the brake drum and the tire mounting wheel. For example, such construction permits a large braking surface to be formed on the brake drum 10, and the tire wheel may be made of relatively small diameter, to mount the small diameter tires which are now extensively used.

The drum 10, as described in said copending application is formed from a generally disc shaped blank.

Wheel formations of this invention are so shaped and constructed that they may be almost completely constructed in forming presses. Machining operations are almost completely eliminated.

The body of a wheel formation of this invention is so shaped that it may be formed from a relatively simple slug of metal of the cast or wrought aluminum alloy type. The slug is subjected to a very small number of press operations.

The final shape of the wheel formation permits an easy liquid-like flow of the metal from the initial slug shape to the final wheel shape under the impulse of a very small number of press operations.

These press operations are particularly designed to cooperate in a novel manner with the material of the wheel formation to produce a finned or ribbed wheel formation of great beauty, strength and self cooling power from a simple slug or blank with or without a simple steel or cast iron brake band.

The wheel 24 is formed by oppositely directed press extrusion actions which produce a substantially cylindrical intermediate product having a generally H-shaped cross section with a transverse web with oppositely extending cylindrical walls having internal longitudinal ribs. The oppositely extending cylindrical walls are then outwardly spread in press formations to produce the opposite tire receiving rim members which form the inward cylindraceous surface 26.

The foregoing method of forming these wheel formations 10 and 24 with the ribs 22 and 28 is more fully described in said copending application to which reference is made for a more detailed description thereof.

The ribbed bearing receiving drum and the ribbed tire mounting wheel cooperate with each other in a new and useful manner because of the dovetailed construction of the ribs.

The ribbed bearing receiving drum and the ribbed tire mounting wheel are individually of very advantageous construction. The ribs on these members impart great strength to the structures. Consequently these members may be made of the light weight aluminum alloys herein disclosed which attain great strength when worked and heat treated as disclosed in said copending application. Therefore, these members are rendered strong and light in weight because of the light weight, strong materials used, the method of making the members, and the ribbed formation of such members.

While the form of the invention now preferred has been disclosed as required by the statutes, other forms may be used, all coming within the scope of the claims which follow.

What is claimed is:

1. In combination: a bearing receiving brake drum having a rim portion with an outward cylindraceous rim surface coaxial with the axis of rotation of said drum, said drum having a bearing receiving central portion; outward ribs circumferentially spaced on said outward cylindraceous surface generally parallel to said axis of rotation; a tire mounting wheel having an inward cylindraceous surface overlapping outside said cylindraceous rim surface and having inward ribs circumferentially spaced on said inward cylindraceous surface to dovetail between and be completely spaced from certain of said outward ribs with free air flow spaces along the sides of said inward ribs and along the sides of said outward ribs and with the inward ribs and the sides of said inward ribs being completely spaced from the outward ribs and the sides of said outward ribs to produce free air flow passages and a complete conduction thermal break between said inward and outward ribs and the sides of said ribs; and attaching means to attach said tire mounting wheel to said bearing drum in a manner so said inward and outward ribs may be oriented in dovetailing relationship.

2. A combination according to claim 1 in which said drum includes an intermediate supporting disc shaped portion joining said rim portion and said bearing receiving central portion and in which said tire mounting wheel has an inward disc shaped portion, said attaching means attaching said tire mounting wheel to said drum at said disc shaped portions.

3. A combination according to claim 2 in which said disc shaped portions diverge outwardly from said attaching means.

4. A combination according to claim 1 in which said outward ribs are evenly spaced circumferentially around said outward cylindraceous surface and said inward ribs are evenly spaced around said inward cylindraceous surface and the number of inward ribs are so related to the number of outward ribs that said ribs have dovetailing relationship with free air flow spaces along dovetailing sides of said inward ribs and along the sides of said outward ribs.

5. A combination according to claim 1 in which air flow means is provided to cause air to pass between the sides of said inward and outward ribs.

6. In combination: a brake drum having an axis of rotation and a tubular brake rim portion with an inward cylindrical brake surface coaxial with said axis of rotation and with outward ribs spaced in the direction of rotation around the periphery of the outer surface of said rim portion and extending generally transverse to the direction of rotation of said drum, said drum having a bearing receiving central portion joined to said rim portion; and a tire mounting wheel having an inward tubular surface overlapping said rim portion and having inward ribs generally transverse to the direction of rotation of said drum and spaced to dovetail between and be completely spaced from certain of said outward ribs, said inward ribs and outward ribs having spaced sides where they dovetail to provide free air flow along said spaced sides and with the inward ribs and the sides of said inward ribs being completely spaced from the outward ribs and the sides of said outward ribs to produce free air flow passages and a complete conduction thermal break between said inward and outward ribs and the sides of said ribs; and means detachably to attach said tire receiving wheel to said drum and automatically to orient said inward and outward ribs in dovetailing relationship.

7. A combination according to claim 6 in which said drum includes an intermediate supporting portion joining said rim portion and said bearing receiving central portion and in which said tire mounting wheel has an inward disc shaped portion and in which said attaching means attaches said tire mounting wheel disc shaped portion to said bearing receiving central portion.

8. A combination according to claim 7 in which said disc shaped portion and said central portion diverge outwardly from said attaching means.

9. A combination according to claim 6 in which said outward ribs are evenly spaced circumferentially around said periphery of said outer surface and said inward ribs are evenly spaced inside said tubular surface and the number of inward ribs are so related to the number of outward ribs that said ribs have dovetailing relationship with free air flow spaces along the dovetailing sides of said inward ribs and along the sides of said outward ribs.

10. A combination according to claim 6 in which there are a plurality of outward ribs between adjacent inward ribs.

11. In combination: a wheel construction having an axis of rotation, a tubular brake rim portion having an inward cylindrical brake surface coaxial with said axis of rotation and outward ribs spaced in the direction of rotation around the periphery of the outer surface of said rim portion and extending generally transverse to the direction of rotation of said wheel construction, said wheel construction having a tire mounting portion with an inward tubular surface overlapping said outer surface of said rim portion and having an outer tire mounting surface, said inward tubular surface having inward ribs generally transverse to the direction of rotation of said drum and spaced to dovetail between and have free air flow between the dovetailed sides of certain of said outward ribs.

12. A combination according to claim 11 in which the number of inward ribs is different from the number of outward ribs.

13. A combination according to claim 11 in which said outward ribs are evenly spaced circumferentially around said periphery of said outer surface and said inward ribs are evenly spaced inside said tubular surface and the number of inward ribs are different from the number of outward ribs and with said ribs having dovetailing relationship.

14. In combination: a brake drum construction having a generally disc shaped drum supporting construction generally perpendicular to the axis of rotation of said drum construction with an inner central bearing construction and with an outer brake receiving cantilever cylindraceous rim portion; outward substantially radial ribs on said rim portion substantially parallel to said axis of rotation and having free air flow outward rib sides; a tire mounting wheel having a disc shaped tire well supporting construction having a tire well with a cantilever cylindraceous tire well portion with an inward cylindraceous surface overlapping outside said cylindraceous rim portion; inward substantially radial ribs on said inward cylindraceous surface substantially parallel to said axis of rotation and having free air flow inward rib sides dovetailed in air flow spaced relationship with said outward rib sides, said cantilever cylindraceous rim portion, and said outward ribs and outward rib sides being completely spaced from said inward cylindraceous surface and said inward ribs and inward rib sides in free air flowing cooling relationship; and means detachably to secure said disc shaped drum supporting construction and said disc shaped tire well supporting construction centrally inward from said cantilever cylindraceous rim portion and from said cantilever cylindraceous tire well portion.

15. A combination according to claim 14 with said disc shaped tire well supporting construction having air flow opening means connected in air flow relationship with said inward rib sides and said outward rib sides.

References Cited in the file of this patent

UNITED STATES PATENTS

| | | |
|---|---|---|
| 2,105,317 | Frank | Jan. 11, 1938 |
| 2,643,445 | Baker | June 30, 1953 |
| 2,927,822 | Rabe | Mar. 8, 1960 |
| 3,004,796 | Atkin | Oct. 17, 1961 |
| 3,005,259 | Benya et al. | Oct. 24, 1961 |
| 3,016,269 | De Lorean | Jan. 9, 1962 |
| 3,043,631 | Swoboda | July 10, 1962 |